(12) United States Patent  
Tadros

(10) Patent No.: US 8,580,174 B2  
(45) Date of Patent: Nov. 12, 2013

(54) METHOD FOR TEXTURING POLYMERIC FILMS AND ARTICLES COMPRISING THE SAME

(75) Inventor: Safwat Ebeid Tadros, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 699 days.

(21) Appl. No.: 11/756,835

(22) Filed: Jun. 1, 2007

(65) Prior Publication Data

US 2008/0160275 A1 Jul. 3, 2008

Related U.S. Application Data

(60) Provisional application No. 60/882,692, filed on Dec. 29, 2006.

(51) Int. Cl.
  *B29C 59/02* (2006.01)
  *B29D 7/01* (2006.01)

(52) U.S. Cl.
  USPC ......... 264/210.2; 264/1.34; 264/1.6; 264/2.7; 264/173.1; 264/173.15; 264/175; 264/211.12; 264/284; 264/293

(58) Field of Classification Search
  None
  See application file for complete search history.

(56) References Cited

U.S. PATENT DOCUMENTS

| | | |
|---|---|---|
| 3,756,760 A | 9/1973 | McBride |
| T927010 I4 | 10/1974 | Whitfield et al. |
| 4,610,833 A | 9/1986 | Kanesaki et al. |
| 4,673,708 A * | 6/1987 | Rock et al. ................ 525/66 |
| 4,835,245 A | 5/1989 | Takasa et al. |
| 4,880,589 A * | 11/1989 | Shigemoto et al. ........... 264/216 |
| 4,908,418 A * | 3/1990 | Holub ........................... 525/425 |
| 5,149,481 A * | 9/1992 | Gross et al. ................ 264/210.2 |
| 5,238,737 A * | 8/1993 | Burkhardt et al. ............. 428/328 |
| 5,594,070 A | 1/1997 | Jacoby et al. |
| 5,817,395 A | 10/1998 | Karsten et al. |
| 6,395,364 B1 | 5/2002 | Davis et al. |
| 6,605,357 B1 | 8/2003 | Miyake et al. |
| 6,773,649 B2 | 8/2004 | Bourne et al. |
| 2002/0076562 A1* | 6/2002 | Desu et al. .................... 428/447 |

(Continued)

FOREIGN PATENT DOCUMENTS

| | | |
|---|---|---|
| EP | 0219198 A1 | 1/1986 |
| EP | 1566251 A1 | 8/2005 |

OTHER PUBLICATIONS

International Search Report dated Dec. 11, 2007 for application No. US2007076842.

(Continued)

*Primary Examiner* — Jeffrey Wollschlager
(74) *Attorney, Agent, or Firm* — Cantor Colburn LLP

(57) ABSTRACT

Disclosed herein is a method comprising deforming an organic polymer composition at a temperature below a glass transition temperature of an organic polymer in the organic polymer composition; the deforming being conducted by an application of a shear force, an elongational force, a compressive force, or a combination comprising at least one of the foregoing forces; the forces being applied to the organic polymer composition as it is disposed between a first roll that comprises a rubber surface and a second roll that comprises a textured metal surface; the deforming producing a textured film having a ratio of texturing of about 0.5 to about 3; the textured film having a thickness of about 5 to about 75 micrometers and an average roughness of about 0.3 to about 6 micrometers on opposing surfaces of the film.

29 Claims, 2 Drawing Sheets

(56) References Cited

U.S. PATENT DOCUMENTS

| | | |
|---|---|---|
| 2003/0127770 A1 | 7/2003 | Xi et al. |
| 2003/0175488 A1* | 9/2003 | Asthana et al. ............... 428/212 |
| 2004/0209057 A1* | 10/2004 | Enlow et al. .................. 428/220 |
| 2004/0220333 A1* | 11/2004 | Tadros et al. .................... 525/55 |
| 2004/0228141 A1* | 11/2004 | Hay et al. ...................... 362/555 |
| 2005/0077647 A1* | 4/2005 | Coyle et al. ............... 264/211.12 |
| 2005/0164007 A1* | 7/2005 | Numrich et al. ........... 428/411.1 |
| 2005/0275764 A1* | 12/2005 | Ambrose et al. ................ 349/62 |
| 2006/0056031 A1* | 3/2006 | Capaldo et al. ................ 359/619 |
| 2006/0071362 A1* | 4/2006 | Yeung et al. .............. 264/211.12 |
| 2007/0126144 A1* | 6/2007 | Jin et al. ..................... 264/210.2 |
| 2007/0281129 A1* | 12/2007 | Chan et al. .................... 428/141 |

OTHER PUBLICATIONS

Japanese Patent No. JP60132714; Publication Date: Jul. 15, 1985; 2 pages; Abstract Only.
Japanese Patent No. JP8025498; Publication Date: Jan. 30, 1996; 1 page; Abstract Only.

* cited by examiner

METHOD FOR TEXTURING POLYMERIC FILMS AND ARTICLES COMPRISING THE SAME

CROSS-REFERENCE TO RELATED APPLICATIONS

This application claims the benefit of U.S. Patent Application Ser. No. 60/882,692, filed Dec. 29, 2006, which is incorporated by reference herein in its entirety.

BACKGROUND

This disclosure relates to method for texturing polymeric films and to articles comprising these textured films.

Films manufactured from organic polymers (having glass transition temperatures of greater than or equal to about 130° C.) that have thicknesses of less than or equal to about 75 micrometers and large surface widths of greater than or equal to about 1,200 millimeters are generally difficult to manufacture without defects such as wrinkles, comets, veins, die lines, gel particles, particulate inclusions, or the like. Texturing films improves their appearance and minimizes the visibility of defects. Texturing the surfaces of such films improves the ability of the film to adhere to another surface, improves printability, reduces the visibility of surface scratches and the other aforementioned defects to one observing or inspecting the textured film.

Textured films are often manufactured via a solution based process, wherein the organic polymer is dissolved in a solvent to create a polymer solution. The polymer solution is then cast onto a smooth surface. Solvent is allowed to evaporate from the cast polymer solution. A doctor blade is drawn across the surface of the cast polymer solution to produce a film having a uniform thickness following which the surface is textured. The texturing afforded by this method occurs on only one surface of the film. This is an expensive process and has a negative environmental impact because of the presence of the solvent. Manufacturing textured films from the melt (molten state) is less expensive than those manufactured from solution, but the melt process is fraught with problems due to electrostatic charges that develop on the surface of the film that cause pinning of the film.

It is therefore desirable to develop a method to texture films having a thickness of less than or equal to about 100 micrometers when the films are manufactured from a molten state. It is also desirable to develop a textured film whose texture reduces the visibility of defects present in the film.

SUMMARY

Disclosed herein is a method comprising deforming an organic polymer composition at a temperature below a glass transition temperature of an organic polymer in the organic polymer composition; the deforming being conducted by an application of a shear force, an elongational force, a compressive force, or a combination comprising at least one of the foregoing forces; the forces being applied to the organic polymer composition as it is disposed between a first roll that comprises a rubber surface and a second roll that comprises a textured metal surface; the deforming producing a textured film having a ratio of texturing of about 0.5 to about 3; the textured film having a thickness of about 5 to about 75 micrometers and an average roughness of about 0.3 to about 6 micrometers on opposing surfaces of the film.

Disclosed herein too is a textured film having an average roughness of about 0.3 to about 6 micrometers; wherein a surface average roughness on one surface of the textured film is within about 25% of a surface average roughness on an opposing surface of the textured film.

DETAILED DESCRIPTION

Figure 1:
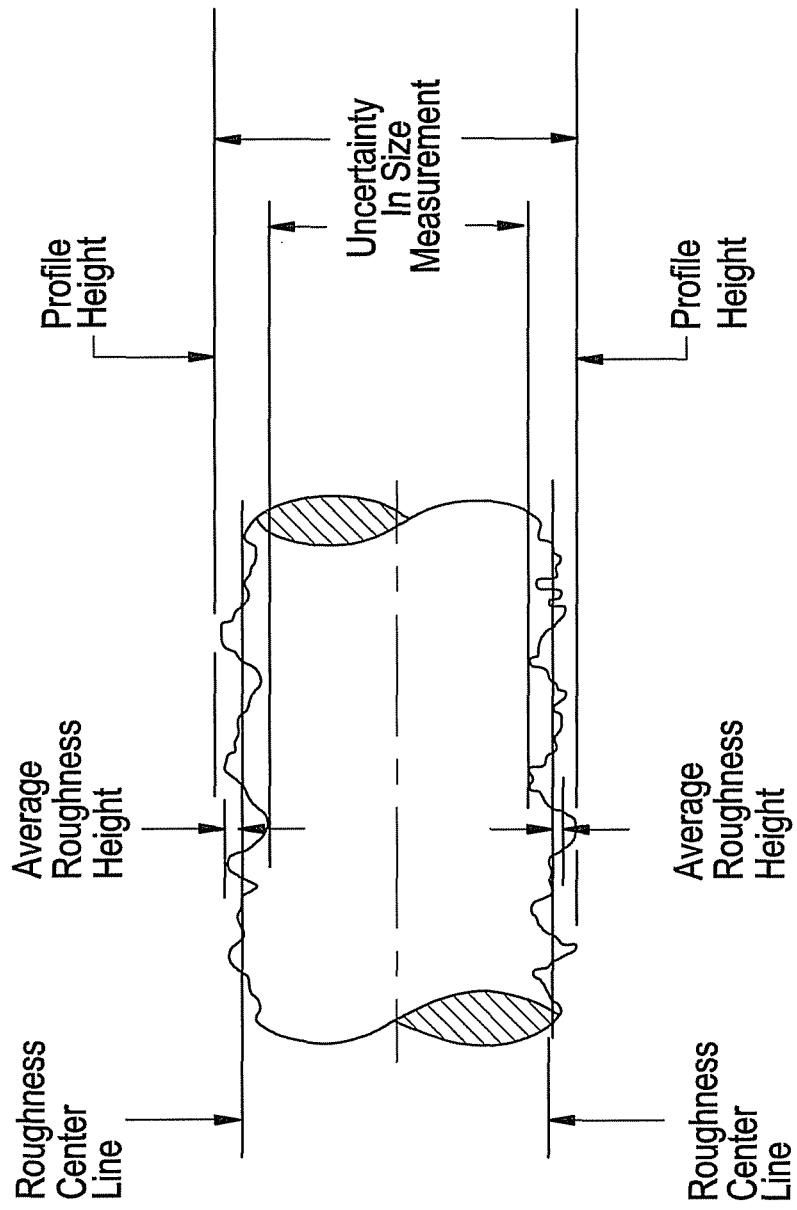
FIG. 1 depicts how the roughness is measured.

Disclosed herein is a method for manufacturing textured films, wherein the textured films have a thickness of about 5 to about 100 micrometers. Disclosed herein too is a method for manufacturing films having a polish/polish surface (wherein opposing surfaces are polished) without the application of stress to the film. In one exemplary embodiment, the films are manufactured from an organic polymer composition having a glass transition temperature greater than or equal to about 100° C. In another exemplary embodiment, the films are manufactured from an organic polymer composition that displays a yield point strain of less than or equal to about 10%, when tested under tension as per American Society for the Testing of Materials D 638 (ASTM D 638).

In an exemplary embodiment for producing textured films, the method comprises deforming an extrudate at a temperature below the glass transition temperature of the organic polymer composition. An exemplary method of conducting the deforming is calendaring. The calendaring is conducted between opposing rolls in a roll mill, wherein the opposing rolls comprise a first roll that has a textured rubber surface and a second roll that applies pressure to the extrudate in a direction opposed to the pressure applied by the first roll. The second roll comprises a textured metal surface.

The textured films as well as the polish/polish films advantageously have a birefringence less than or equal to about 100 nanometers. The films can be textured only on one surface or on both surfaces as desired. Texturing of the film reduces the probability that defects such as wrinkles, gels, comets, veins, die lines, gel particles, particulate inclusions, or the like, will be easily noticed. The textured film as the polish/polish films can be opaque, transparent or translucent.

It is desirable for the surface average roughness on one surface of the textured film to be equal to the surface average roughness on the opposing surface of the textured film. In one embodiment, the surface average roughness on one surface of the textured film is within about 10%, specifically within about 15%, more specifically within about 20%, and even more specifically within about 25% of the surface average roughness on an opposing surface of the textured film.

In one exemplary embodiment, the textured films advantageously have a surface roughness as measured by the average roughness that is greater than the average roughness of the textured rolls that are used to manufacture the textured film. This result is unexpected. In addition, both opposing surfaces of the film can be textured when calendaring the organic polymeric composition in a roll mill that comprises opposing textured rolls. The opposing surfaces of the film both have surface areas bounded by width dimensions greater than or equal to about 0.25 meter and length dimensions greater than or equal to about 0.25 meter, specifically width dimensions greater than or equal to about 0.5 meter and length dimensions greater than or equal to about 0.5 meter, and more specifically width dimensions greater than or equal to about 1.0 meter and length dimensions greater than or equal to about 1.0 meter. The textured film generally has a thickness of about 5 to about 100 micrometers, specifically about 25 to about 75 micrometers.

In another exemplary embodiment, the textured films advantageously have one surface (encompassed by width dimensions greater than or equal to about 0.25 meter and length dimensions greater than or equal to about 0.25 meter) that is textured while the opposing surface has a polish/polish finish when the respective film is textured via calendaring in a roll mill that has one textured rubber roll and an opposing polish/polish steel roll.

The organic polymer composition can comprise thermoplastic polymers, blends of thermoplastic polymers, thermosetting polymers, blends of thermosetting polymers or blends of thermoplastic polymers with thermosetting polymers. The organic polymer composition can comprise oligomers, polymers, ionomers, dendrimers, copolymers such as block copolymers, graft copolymers, star block copolymers, random copolymers, or the like, or a combination comprising at least one of the foregoing organic polymers.

As noted above, the textured film comprises an organic polymer composition that has a glass transition temperature of greater than or equal to about 100° C. When blends of organic polymers and/or copolymers are used to manufacture a textured film, at least one organic polymer used in the organic polymer composition has a glass transition temperature that is greater than or equal to about 100° C.

As noted above too, the textured films are manufactured from an organic polymer composition that displays a yield point strain of less than or equal to about 10%, when tested as per ASTM D 638. In one embodiment, the textured films are manufactured from organic polymer composition that displays a yield point strain of less than or equal to about 6%, specifically less than or equal to about 5%, and more specifically less than or equal to about 4%, when tested as per ASTM D 638. The yield point strain is the strain at the yield point, wherein the yield point is defined as that point in a tensile test where the test piece begins to extend permanently. The yield point is that stress at which strain increases without accompanying increase in stress. If the load is reduced to zero, the test piece will not return to its original length.

Examples of organic polymers that can be used in the pure form or in the form of blends and/or copolymers (in the organic polymer composition) to manufacture the textured films are polyolefins, polyacetals, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polybenzimidazoles, polypyrrolidines, polyvinyl ethers, polyvinyl thioethers, polyvinyl alcohols, polyvinyl ketones, polyvinyl halides, polyvinyl nitrites, polyvinyl esters, polysulfonates, polysulfides, polythioesters, polysulfones, polysulfonamides, polyureas, polyurethanes, polyphosphazenes, polysilazanes, polysiloxanes, or the like, or a combination comprising at least one of the foregoing organic polymers. An exemplary organic polymer composition comprises a polyetherimide.

Examples of suitable blends of organic polymers are acrylonitrile-butadiene-styrene/nylon, polycarbonate/acrylonitrile-butadiene-styrene, polyphenylene ether/polystyrene, polyphenylene ether/polyamide, polycarbonate/polyester, polyphenylene ether/polyolefin, or a combination comprising at least one of the foregoing blends of thermoplastic resins.

The organic polymers may be blended in any suitable ratios to form the organic polymer composition. The organic polymer composition can comprise binary blends, ternary blends and blends having more than three organic polymers. When a binary blend or ternary blend is used in the textured film, one of the organic polymers in the blend may comprise about 1 to about 99 weight percent (wt %) based on the total weight of the organic polymer composition. Within this range, it is generally desirable to have one of the organic polymers in an amount greater than or equal to about 20, specifically greater than or equal to about 30 and more specifically greater than or equal to about 40 wt %, based on the total weight of the organic polymer composition. Also desirable within this range, is an amount of less than or equal to about 90, specifically less than or equal to about 80 and more specifically less than or equal to about 60 wt % based on the total weight of the organic polymer composition. When ternary blends of blends having more than three polymeric resins are used, the various organic polymers may be present in any desirable weight ratio.

Examples of thermosetting resins are polyurethane, natural rubber, synthetic rubber, epoxy, phenolic, polyesters, polyamides, polyetherimides, silicones, and mixtures comprising any one of the foregoing thermosetting resins.

In one embodiment, in one method of manufacturing the textured film, an organic polymer composition (that has a glass transition temperature of greater than or equal to about 100° C. or has a yield point strain of less than or equal to about 10%, when tested as per ASTM D 638) is first melt blended.

Melt blending of the organic polymer composition involves the use of shear force, extensional force, compressive force, ultrasonic energy, electromagnetic energy, thermal energy or combinations comprising at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or combinations comprising at least one of the foregoing.

Melt blending involving the aforementioned forces may be conducted in machines such as, a single screw extruder, a multiple screw extruder, a Buss kneader, Henschel, helicones, Ross mixer, Banbury, roll mills, molding machines such as injection molding machines, vacuum forming machines, blow molding machine, or then like, or combinations comprising at least one of the foregoing machines. An exemplary melt blending device is a twin screw extruder.

In one embodiment, during the extrusion of the organic polymer composition, the melt blend in the extruder is subjected to melt filtration to remove inclusions and gel particles present in the organic polymer composition. Melt filtration is provided by a breaker plate supported by a screen pack, wherein the screen pack comprises metal screens of various mesh sizes, inserted directly in the melt stream. Screen packs, supported by a breaker plate, are also used to help build up pressure and promote dispersion and mixing within the extruder. Generally the breaker plate and screen pack are located just beyond the screw tip at the end of the extruder barrel. The breaker-plate usually is a disc, or plate, with a series of uniform holes, (approximately 3 nm) machined through its thickness, aligned in the direction of the flow of the melt. The function of the breaker plate is to provide structural support for the screen pack, which can rupture, or "blow through", at the high down-stream pressures in the extruder.

A filter screen is generally a woven metal mesh, or gauze, with a specified number of holes per unit area. In one embodiment, it is desirable to conduct melt filtration of the molten organic polymer composition with a filter screen having a mesh size of about 5 to about 50 micrometers, specifically about 10 to about 40 micrometers, and even more specifically about 15 to about 30 micrometers. An exemplary mesh size for the filter screen is about 15 to about 25 micrometers.

The temperature of the extrudate at the mouth of the die can vary up to about 30° C. above the glass transition temperature ($T_g$) of the organic polymer composition, specifically up to about 25° C. above the glass transition temperature $T_g$ of the organic polymer composition, and more specifically up to about 20° C. above the $T_g$ of the organic polymer composition. When an organic polymer composition comprises a blend and/or copolymers of organic polymers having two distinctly different glass transition temperatures, the extrudate temperature is greater than or equal to about the highest glass transition temperature of the organic polymer composition.

After the extrudate emerges from the extruder, in order to make the textured film without any defects such as die lines, inclusions, comets, veins, or the like, it is generally desirable to deform the extrudate into a film at lower temperatures and at lower speeds than is normally undertaken in the processing of such films. In general with regard to the lower temperatures at which such deformational forces are applied, it is generally desirable to deform the extrudate at temperatures below the glass transition temperature of the extrudate. Thus, while the temperature of the extrudate is not always necessarily below the glass transition temperature ($T_g$) of the extrudate, the device (machine part) through which the deformational force is applied, is held at a temperature that is lower than the glass transition temperature of the extrudate.

In an exemplary embodiment, the deforming forces are shear, compressive or elongational forces or a combination at least one of the foregoing forces. These deformational forces may be applied either simultaneously or sequentially if desired. It is generally desired to maintain the temperature of the machine part contacting the extrudate and applying these deformational forces at temperatures below the $T_g$ of the extrudate. In another exemplary embodiment, it is desirable to maintain the temperature of the machine part contacting the extrudate and applying the deformational forces at 5° C., specifically 10° C., more specifically 15° C. and most specifically 20° C. below the $T_g$ of the extrudate.

As noted above, when the organic polymer composition comprises a blend and/or copolymers of organic polymers having two distinctly different glass transition temperatures and when there is some incompatibility between the respective organic polymers, it is desirable to maintain the temperature of the machine part contacting the extrudate and applying the deformational forces at a temperature of less than or equal to about the highest glass transition temperature of the organic polymer composition.

In an exemplary embodiment, the extrudate is subjected to deformation in a roll mill. An exemplary form of deformation is thermoforming via calendaring in the roll mill. In one embodiment, the roll mill generally comprises one textured rubber roll. In another embodiment, the roll mill generally comprises one textured rubber roll and one textured metal roll. An exemplary textured metal roll is a textured steel roll. Both, two or three roll mills can be advantageously used to produce the textured film. In one embodiment, the deformation of the extrudate is used to texture the film. In another embodiment, two or more textured rolls are used to produce texturing on both surfaces of the film.

In one embodiment, the textured rubber roll or the textured metal roll has a diameter of about 4 centimeters to about 4 meters, specifically about 15 centimeters to 1.5 meters, and more specifically about 25.4 centimeters to about 1 meter, and even more specifically about 30 centimeters to about 60 centimeters. The line speed of the extrudate at a point just prior to its entry into the nip of the roll mill is about ½ meter per minute (m/min) to about 1,000 m/min, specifically about 10 to about 300 m/min and more specifically about 20 to about 150 m/min. The textured rubber roll may or may not be the driving roll (i.e., it may or may not be connected to a motor that drives the rolls).

In one embodiment, the distance between the mouth of the die of the extruder and the nip of the roll mill is generally about 2 to about 30 centimeters, specifically about 6 to about 20 centimeters, and more specifically about 7.5 to about 15 centimeters.

Texturing is used to produce films with a surface roughness. The surface roughness is expressed as an average roughness or RA. The average roughness is also known as the arithmetic average and centerline average. It is the arithmetic average of the absolute values of the measured profile height deviations taken within the sampling length and measured from the graphical centerline. Measurements of the average roughness are shown in the FIG. 1. Average roughness readings are generally made with stylus type instruments of the continuously averaging type. In deforming the extrudate it is desirable to produce a film having an average roughness (RA) value of about 0.3 to about 6 micrometers, specifically about 0.4 to about 3 micrometers, more specifically about 0.5 to about 2 micrometers, and even more specifically about 0.6 to about 1.5 micrometers.

In one embodiment, in order to produce a textured film having an average roughness of about 0.3 to about 6 micrometers, it is desirable for the textured rubber roll to have a surface average roughness of about 1 to about 6 micrometers and the metal roll to have a surface average roughness of about 2 to about 8 micrometers. Within the above-specified values, it is desirable to have a surface average roughness of about 2 to about 5 micrometers, specifically about 3 to about 4 micrometers for the textured rubber roll. Within the above-specified values, it is desirable to have a surface average roughness of about 3 to about 7 micrometers, specifically about 4 to about 6 micrometers for the textured metal roll.

In one embodiment, the textured film can have a replication efficiency of 100% or more on the side of the film that contacts the surface of the textured rubber roll during deformation. Replication efficiency is defined as RA of one surface of the film divided by the RA of the rubber roll.

As noted above, it is desirable to produce texturing on both surfaces of the film when only one textured rubber roll is used during the deformation of the extrudate. The use of a single textured roll, wherein the textured roll is a textured rubber roll permits the film to have a birefringence retardation of less than or equal to about 100 nanometers, specifically less than or equal to about 50 nanometers, specifically less than or equal to about 30 nanometers, and even more specifically less than equal to about 20 nanometers.

In an exemplary embodiment, the textured surfaces of the textured film can be converted to a polish/polish surface by annealing the film at a temperature greater than or equal to about the highest glass transition temperature of the organic polymer composite.

For example, if $T_{gA}$ is the glass transition temperature of organic polymer A and $T_{gB}$ is the glass transition temperature of organic polymer B both of which are contained in an extrudate having an extrudate glass transition temperature of $T_{g(A+B)}$, such that $T_{gB} > T_{g(A+B)} > T_{gA}$, then annealing the textured film at a temperature greater than or equal to $T_{gB}$ will convert the film from one having a textured surface to one having a polish/polish surface.

It is generally desirable to anneal the textured film at a temperature of greater than or equal to about 5° C., specifically greater than or equal to about 10° C., more specifically greater than or equal to about 15° C., and even more specifically greater than or equal to about 20° C. above the highest glass transition temperature of the textured film.

It is generally desirable to anneal the textured film for a time period of up to about 30 minutes. Within this range it is generally desirable to anneal the textured film for a time period greater than or equal to about 10 seconds, specifically greater than or equal to about 60 seconds, more specifically greater than or equal to about 1 minute, and even more specifically greater than or equal to about 2 minutes. Also desirable within this range, is an annealing time of less than or equal to about 25 minutes, specifically less than or equal to about 20 minutes, and more specifically less than or equal to about 15 minutes. The film or sheet may be annealed either using heating comprising conduction, convection, radiation or a combination comprising at least one of the foregoing methods of heating.

In one embodiment, the method may be used to produce multilayer films having one or more textured surfaces. In an exemplary embodiment, the method may be used to produce multilayer films having both textured surfaces. Multilayered films are first manufactured by co-extrusion. An exemplary multilayered film can comprise a plurality of layers in intimate contact with one another. In one embodiment, two or more layers can be disposed to be in intimate contact with one another to form the multilayer film. In one embodiment, the largest surfaces of the respective films are in intimate contact with one another in order to form the multilayer film. Following co-extrusion, the multilayered film is subjected to deformation in a roll mill as described above.

In one embodiment, in one manner of co-extruding of the multilayered film, the melt streams (extrudates) from the various extruders are fed into a feed block die where the various melt streams are combined before entering the die. In another embodiment, the melt streams from the various extruders are fed into a multi-manifold internal combining die. The different melt streams enter the die separately and join just inside the final die orifice. In yet another embodiment, the melt streams from the various extruders are fed into a multi-manifold external combining die. The external combining dies have completely separate manifolds for the different melt streams as well as distinct orifices through which the streams leave the die separately, joining just beyond the die exit. The layers are combined while still molten and just downstream of the die. An exemplary die used in the production of the multilayered film is a feed block die. In an exemplary embodiment, the extruders used for the co-extrusion of the multiwall film are single screw extruders respectively. The co-extruded sheet is then calendared in a roll mill to produce a textured multilayer film.

The films obtained from the above detailed method are optically clear, and can be manufactured in compositions having a high melt rate so as to permit them to be molded upon substrates that can withstand temperatures of less than or equal to about 400° F. Polymeric extrudates manufactured in such a manner advantageously do not possess any defects such as wrinkles, comets, veins, die lines, gel particles, particulate inclusions, or the like, and therefore can be utilized in optical applications such as optical elements, ophthalmic sheets, microscopes and the like. In addition additives which facilitate the incorporation of functional properties such as light polarization, photo-chromism, tint, color, decor, indicia, hardness, anti-abrasion, anti fog, X-ray recording capabilities, photographic film capabilities, digital storage capabilities, light management capabilities, and the like may be added to the polymeric extrudate.

The following examples, which are meant to be exemplary, not limiting, illustrate compositions and methods of manufacturing some of the various embodiments of the textured films described herein.

EXAMPLE

Example 1

This example was conducted to demonstrate the manufacture of textured films using the method described above. ULTEM® 1000, a polyetherimide, manufactured by the General Electric Company was extruded and then subjected to calendaring in a two roll mill.

The extruder conditions and the temperature and speed of the rolls in the roll mill are shown in the Table 1 below. In the Examples in the Table 1, Sample #'s A and B are comparative samples. The extrusion was conducted in a single screw extruder having an average length to diameter ratio of 24:1. The screw had a diameter of 38 millimeters. The extruder has 4 barrels (indicated as zones in the Table 1) and a die, the temperatures of which are described below. Roll 1 was a textured rubber roll, while for the Samples A and B, the Roll 2 was a steel roll that had a polish/polish surface. Samples A and B are therefore comparative examples. In the Sample #'s 1-7, the Roll 1 was a textured rubber roll, while Roll 2 is a textured steel roll. Roll 1 had an outer diameter of 30 centimeters, while Roll 2 had an outer diameter of 30 centimeters. For the Sample #'s 1-3, Roll 1 was a textured rubber roll having an RA (average roughness) of about 1.96 micrometers while the Roll 2 was a textured steel roll having an RA of about 5.90 micrometers. For the Sample #'s 4-6, Roll 1 was a textured rubber roll having an RA of about 1.38 micrometers while the Roll 2 was a textured steel roll having an RA of about 2.55 micrometers.

Sample #7 was produced using a single stage, single screw extruder having L/D of 32:1 and a diameter of 105 millimeters. The extruder had 9 zones (barrels) having temperature values (from throat to die respectively) of 26.6° C., 320° C., 321° C., 339.8° C., 340.0° C., 341.3° C., 340.1° C., 338.1° C. and 350.1° C. The screw speed was 32 rpm. For Sample #7, the sample was melt filtered during extrusion using a 15 micrometer centered metal filter.

Sample #7 was calendared in a three roll mill. Roll 1 (textured rubber roll) was set at a temperature of 59° C., while Roll 2 (textured steel roll) was set at a temperature of 130° C., while Roll 3 was set at a temperature of 124° C. Roll 3 was a take-off roll. The linear speed was 37.1 meters per minute. For Sample #7, Roll 1 was a textured rubber roll having an RA of about 2.36 micrometers while the Roll 2 was a textured steel roll having an RA of about 4.72 micrometers. The rubber textured roll and the textured steel roll had an outer diameter of 609 millimeters. Sample #7 had a width of 63 inches (about 160 centimeters) and was trimmed after deformation to have a final film width of 50 inches.

The film RA values in Table 1 are shown in microinches and were the average of 3 measurements conducted using a Dektak 3 surface profiler. The visual gel count noted in the Table 2 is the gel count per square meter of film.

TABLE 1

| Sample # | Zone 1 (° F.) | Zone 2 (° F.) | Zone 3 (° F.) | Zone 4 (° F.) | Die Temp. (° F.) | Screw Speed (RPM) | Roll 1 Temp. (° F.) | Roll 2 Temp. (° F.) | Linear Speed (feet/minute) |
|---|---|---|---|---|---|---|---|---|---|
| A | 610 | 620 | 630 | 640 | 650 | 25 | 110 | 240 | 28.5 |
| B | 620 | 640 | 660 | 670 | 680 | 45 | 120 | 240 | 17.7 |
| 1 | 660 | 670 | 680 | 690 | 700 | 26.2 | 110 | 350 | 52.5 |
| 2 | 635 | 645 | 655 | 665 | 675 | 23 | 110 | 300 | 42 |
| 3 | 660 | 670 | 680 | 690 | 700 | 42 | 110 | 220 | 52.5 |
| 4 | 620 | 630 | 640 | 645 | 650 | 14 | 110 | 330 | 32.25 |
| 5 | 640 | 650 | 660 | 670 | 675 | 28 | 110 | 300 | 42 |
| 6 | 660 | 670 | 680 | 690 | 700 | 28 | 110 | 330 | 32.25 |
| 7 | See paragraphs [0047] and [0048] | | | | | | | | |

Table 2 below shows the properties of the calendared films.

| | Sample #'s | | | | | | | | |
|---|---|---|---|---|---|---|---|---|---|
| | A | B | 1 | 2 | 3 | 4 | 5 | 6 | 7 |
| Gauge in micrometers | 25.0 | 125.0 | 25.0 | 37.5 | 50.0 | 25.0 | 37.5 | 50.0 | 25 |
| RA of the film Matte Side (microinches*) | 10.0 | 13.0 | 54.6 | 54.1 | 64.7 | 8.5 | 10.5 | 10.7 | 77.2 |
| RA of the film Velvet Side (microinchhes*) | 4.2 | 0.8 | 56.6 | 43.6 | 70.1 | 15.6 | 14.4 | 15.8 | 87.5 |
| RA of the Rubber roll (Roll 1) (microinches*) | 35.0 | 35.0 | 50.0 | 50.0 | 50.0 | 35.0 | 35.0 | 35.0 | 70 |
| RA of the Steel roll (Roll 2) (microinches*) | polish | polish | 150.0 | 150.0 | 150.0 | 65.0 | 65.0 | 65.0 | 135 |
| Rubber Side Replication Ratio | — | — | 1.09 | 1.08 | 1.29 | 0.24 | 0.30 | 0.31 | 1.83 |
| Film Steel side/Film Rubber Side | — | — | 1.04 | 0.81 | 1.08 | 1.84 | 1.37 | 1.48 | 0.99 |
| Gels** count per m$^2$ | 646 | 57 | 517 | 0 | 0 | 517 | 9,817 | 1,550 | 0 |
| Gels and Specks** total count per m$^2$ | 19,380 | 1,014 | 4,134 | 2,583 | 517 | 15,500 | 16,017 | 3,100 | 0 |

*1 micrometer = (1/25.4) microinches
**Counts made by observer A

As can be seen from the Table 2, the comparative samples A and B (which were deformed (calendared) on a roll mill having one textured rubber roll and an opposing polish/polish roll), display one surface having a matte finish with an average roughness of 10 and 13 microinches respectively, while the opposing surfaces have a velvet polish/polish surface with an average roughness of less than 4.2 microinches.

However, the Sample #'s 1, 2 and 3 that are representative of the embodiments of this disclosure, display opposing textured surfaces with substantially equal roughness on both sides of the film. Sample #'s 1, 2 and 3 demonstrate more than 100% replication efficiency. As noted in the Table 2, the counts were made by a person Observer A. It is to be noted that different observations can be made by different observers and hence this information is being provided. A test to correlate the observations made by different observers was not conducted.

Sample #'s 4, 5 and 6 are also representative of the embodiments of this disclosure, display opposing textured surfaces wherein the roughness on the surface of the film that contacted the textured rubber roll is twice that of the roughness on the surface of the film that contacted the polish/polish roll.

Table 2 also demonstrates that when the film is textured with rolls having the appropriate average roughness, the number of specks and gel particles that are visible to the naked eye can be significantly reduced. For example Sample #'s 1, 2 and 3 which were textured using a rubber roll having an average roughness of about 50 microinches (about 2 micrometers) and a steel roll having an average roughness of about 150 microinches (about 6 micrometers), shows a large drop in the number of gel particles that can be counted when compared with the comparative samples A and B. On the other hand, Sample #'s 4, 5 and 6 that were textured using a rubber roll having an average roughness of about 35 microinches and a steel roll having an average roughness of about 65 microinches display a larger number of gel particles that can be counted than the Sample #'s 1, 2 and 3.

Thus by using a textured rubber roll having an average roughness of about 1 to about 6 micrometers and a metal roll to have a surface average roughness of about 2 to about 8 micrometers, the percent of visible defects such as gel particles and specks is reduced by an amount of over 30%, specifically by an amount of over 40%, more specifically by an amount of over 70%, and even more specifically by an amount of about 100% per square meter of textured film.

As can be seen from the Sample #'s 1, 2 and 3, it is desirable for the surface average roughness on one surface of the textured film to be equal to the surface average roughness on the opposing surface of the textured film. In general, as can be seen from the Table 2, the surface average roughness on one surface of the textured film is within about 10%, specifically within about 15%, more specifically within about 20%, and even more specifically within about 25% of the surface average roughness on the opposing surface of the textured film.

Further from the Table 2, it may be seen that the rubber side replication ratio (which is defined as the ratio of the texture (i.e., the average roughness) on the side of the film (that contacts the rubber roll) to the texture on the rubber roll is greater than 1) for Sample #'s 1, 2 and 3, while it is less than 1 for the Sample #'s 4, 5 and 6. For the Sample #8, the rubber side replication ratio is 1.83. The value of the rubber side replication ratio indicates that the textured steel roll is the dominant roll. For example, in the Sample #'s 1, 2 and 3, when the textured steel roll has an RA of about 5.90 micrometers, the rubber side replication ratio is greater than or equal to about 1, while for the Sample #'s 4, 5 and 6, where the textured steel roll has an RA of about 2.55 micrometers, the rubber side replication ratio of less than or equal to about 0.5.

The ratio of texturing (i.e., average roughness) on the surface of the film that contacted the steel roll to the texturing on the surface of the film that contacted the rubber roll during the roll milling is also shown in the Table 2. From these results it may once again be seen that the steel roll is the dominant roll. For example, for the Sample #'s 1, 2 and 3, it can be seen that the ratio is around 1, while for the Sample #'s 4, 5 and 6, the ratio is significantly greater than 1.3. Thus the texture of the steel roll plays an important role in the texture developed on the surface of the film that contacted the rubber roll during manufacturing.

This ratio of roughness on the opposing surfaces of the textured film may also be used to develop an equation from which predictability of the texturing can be achieved for different textured steel rolls. This capability to predict the texturing can be used to make calculations that can facilitate a reduction in haze and improve the Class A roll winding after the texturing process is completed. An improvement in the Class A roll winding prevents adhesion of one layer of film in the roll with an adjacent layer of film in the roll.

Figure 2:
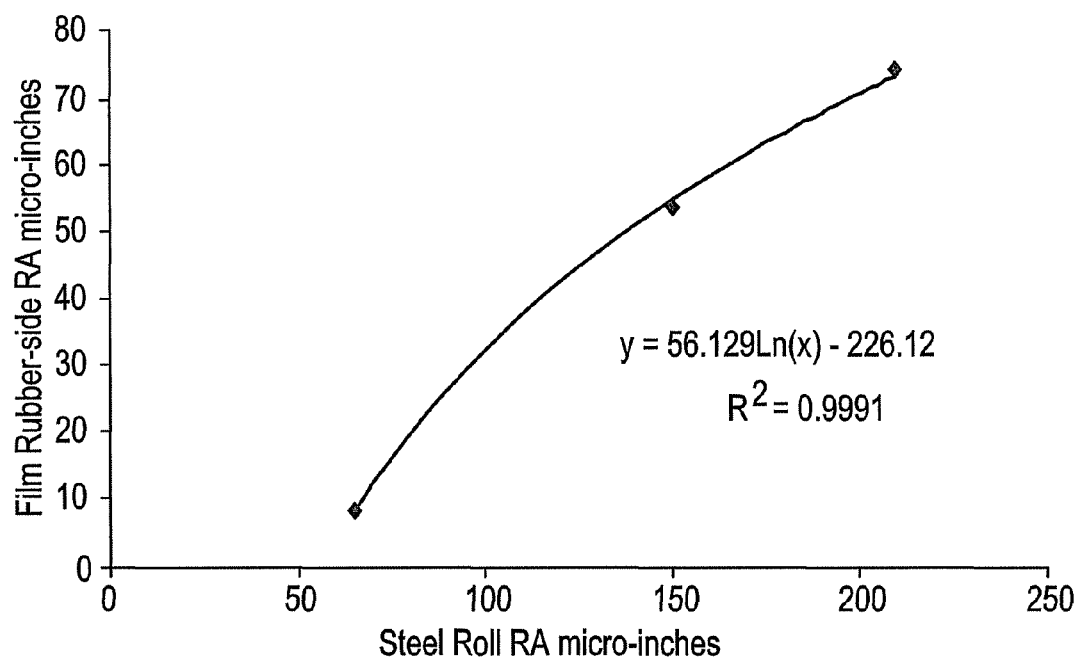
FIG. 2 is a graphical representation of the average roughness measured on the surface of the textured film that was contacted by the rubber roll plotted against the average roughness measured on the surface of the textured film that was contacted by the steel roll.

FIG. 2 is a graphical representation of the average roughness measured on the surface of the textured film that was contacted by the rubber roll plotted against the average roughness measured on the surface of the textured film that was contacted by the steel roll. The measurements shown in the FIG. 2 are from the Table 2. In the FIG. 2, data from the Table 2 pertaining to the average roughness of the matte side of the film was plotted against the average roughness of the velvet side of the film. By using a regression-based curve fitting program to fit the data from the Table 2, the empirical equation (I) below can be used to predict the average roughness on the surface of the film that contacts the rubber roll.

$$y = 56.13 \ln(x) - 226.12 \quad (I)$$

In the Equation (I) as well as in the FIG. 2, y represents the texturing of the film on the surface that contacts the rubber roll, while x represents the texturing of the film on the surface that contacts the steel roll. From the Equation (I) it has been determined that a steel roll having an average roughness of about 80 to about 90 microinches is desirable in order to produce a film have an average roughness of about 25 microinches on both surfaces of the film. A film having an average roughness of about 25 microinches on both surfaces of the film generally has a low haze. Haze values of greater than 30% are considered diffusing, i.e., the film has a cloudy appearance.

It is desirable to have a ratio of texturing that is in an amount of about 0.5 to about 3.0, specifically about 0.75 to about 2.5, and more specifically about 1 to about 2.0.

For example, values for haze and light transmission using ASTM D 1003 in Sample #'s 4 and 7 (both of which had thicknesses of 25 micrometers) in the Table 2 are 2.5% and 88.9% respectively and 20.8% and 88.8% respectively. When the thickness of Sample #7 of Table 2 was increased to 50 micrometers, the film had haze and light transmission using ASTM D 1003 of 69.6% and 86.3% respectively. Films of Sample #7 therefore have a diffuse appearance when the thickness is increased above 50 micrometers. In addition, the films produced by the disclosed method does not display much adhesion when wound on a roll after manufacturing. Therefore, for a specific film gauge one can use the teachings of this disclosure to make class A roll with an enabling texture and a desired haze for a given application.

Example 2

This example demonstrates the effect of annealing and melt filtering on the number of recognizable defects in a textured film. The compositions along with the results are shown in Table 3. Sample A from Table 3 corresponds to Sample A from Table 1 while Sample 1 from Table 3 corresponds to Sample 1 from Table 1. Sample AA in Table 3 is the Sample A from Table 2 that has been subjected to annealing at a temperature of about 215° C. for 15 minutes after being manufactured into a textured film. Sample 1A in Table 3 is the Sample 1 from Table 3 that has been subjected to melt filtering (MF) during the extrusion process. After being manufactured into a textured film, the Sample 1A was subjected to annealing at a temperature of about 215° C. for 15 minutes. Observations of the number of defects in the film were made by an Observer B who was different from the Observer A of Example 1.

Samples 8 and 8A from Table 3 are similar to the Sample #4 of Table 2 and were manufactured under the same conditions as the Sample #4 of Table 2 using a textured rubber roll and one textured steel roll. Samples 8 and 8A contain Ultem 1000 and were produced in the single screw extruder as described above. The roll mill conditions for manufacturing Sample #'s 8 and 8A are described above. The RA for the rubber roll was 35 microinches, while the RA for the steel roll was 65 microinches. Sample #8A was subjected to annealing at a temperature of 215° C. for 15 minutes.

Samples 9 and 9A were manufactured from polycarbonate. The polycarbonate is a developmental grade use for experimentation in the General Electric Company. Sample #'s 9 and 9A were produced using a single stage, single screw extruder having L/D of 33 and a diameter of 105 millimeters. The extruder had 9 zones (barrels) having temperature values (from throat to die respectively) of 50° C., 255° C., 285° C., 285° C., 285° C., 275° C., 275° C., 270° C. and 285° C. The screw speed was 34 rpm. The Sample #'s 9 and 9A were calendared in a roll mill having one textured rubber roll and one textured steel roll. The RA for the rubber roll was 25 microinches, while the RA for the steel roll was 156 microinches. Sample #9A was then subjected to annealing at a temperature of 150° C. for 15 minutes.

Sample #10 was manufactured in a manner similar to Sample #7 in the Table 2 except that it was not melt filtered. Sample #10 contains Ultem 1000. Sample #10 was produced using a single stage, single screw extruder having L/D of 33 and a diameter of 105 millimeters. The extruder had 9 zones (barrels) having temperature values (from throat to die respectively) of 190° C., 300° C., 340° C., 345° C., 350° C., 330° C., 330° C., 330° C. and 340° C. The screw speed was 26 rpm. The Sample #10 was calendared in a roll mill having one textured rubber roll and one textured steel roll. The RA for the rubber roll was 38 microinches, while the RA for the steel roll was polished. Sample #10 was subjected to annealing at a temperature of 220° C. for 15 minutes. The results for the unannealed and the annealed samples are shown in the Table 3.

TABLE 3

| Sample # | Composition/Sample treatment | Gauge in micrometers | Retardation in (nm) | Side A $R_a$ (microinches) | Side B $R_a$ (microinches) | Defects per m² |
|---|---|---|---|---|---|---|
| A | Ultem 1000 | 25 | 20 | 54.59 | 56.56 | 3294 |
| AA | Ultem 1000/Annealed | 25 | 12 | 8.91 | 10.20 | 12013 |
| 1 | Ultem 1000/MF* | 25 | 100 | 75.20 | 74.54 | 194 |
| 1A | Ultem 1000/MF* + Annealed | 25 | 72 | 5.86 | 8.29 | 4456 |
| 8 | Ultem 1000 | 25 | 20 | 15.81 | 13.09 | 2325 |
| 8A | Ultem 1000 + Annealed | 25 | 12 | 9.26 | 10.11 | 5424 |
| 9 | Polycarbonate | 43 | 32 | 81.10 | 32.02 | 194 |
| 9A | Polycarbonate + Annealed | 43 | 0 | 13.72 | 3.75 | 4069 |
| 10 | Ultem L-6 | 27 | 76 | 16.67 | 10.74 | 34100 |

From Table 3, it may be seen that the annealing promotes a reduction in the birefringence retardation. This is due to relaxation of the polymer molecules in the film after the annealing. It can also be seen that the average roughness is equivalent on both sides of the film. This is desirable because it demonstrates that the texturing from the steel roll is transferred in a uniform manner to both opposing surfaces of the textured film.

In addition, from the Table 3, it may be seen that the texturing reduces the number of observable defects per unit area of the film. From the Table 3 it is seen that when the sample is annealed, the texturing is reduced and the defects become visible. Thus the texturing obviates the presence of defects, which is unexpected. From the results in the Table 3, it can be seen that the number of defects is reduced by an amount of greater than or equal to about 50%, preferably greater than or equal to about 60%, and more preferably greater than or equal to about 75% when the film is subjected to annealing.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method comprising:
   deforming an organic polymer composition; the deforming being conducted by an application of a shear force, an elongational force, a compressive force, or a combination comprising at least one of the foregoing forces; the forces being applied to the organic polymer composition as it is disposed between a first roll that comprises a rubber surface and a second roll that comprises a textured metal surface; the deforming producing a textured film; the textured film having a thickness of about 5 to about 75 micrometers and an average roughness of about 0.3 to about 6 micrometers on opposing surfaces of the film; wherein the organic polymer composition enters a gap between the first roll and the second roll at below a glass transition temperature of an organic polymer in the organic polymer composition.

2. The method of claim 1, wherein the rubber surface is a textured rubber surface that has a surface average roughness of about 1 to about 6 micrometers.

3. The method of claim 1, wherein the textured metal surface has a surface average roughness of about 2 to about 8 micrometers.

4. The method of claim 1, further comprising extruding the organic polymer composition.

5. The method of claim 4, wherein the extruding is conducted prior to the deforming.

6. The method of claim 4, wherein the extruding comprises co-extruding a film to produce a co-extruded film.

7. The method of claim 6, wherein the co-extruded film is a multilayered film.

8. The method of claim 2, wherein the textured metal roll has a greater surface average roughness than the surface average roughness of the rubber roll.

9. The method of claim 1, wherein the deforming is conducted at a distance of about 2 to about 20 centimeters from a die of an extruder.

10. The method of claim 1, wherein the deforming is conducted on an organic polymer composition that has a glass transition temperature of greater than or equal to about 100° C. or a yield point strain of less than or equal to about 10%, when tested as per ASTM D 638.

11. The method of claim 10, wherein the organic polymer composition comprises polyolefins, polyacetals, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polybenzimidazoles, polypyrrolidines, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyurethanes, polyphosphazenes, polysilazanes, polysiloxanes, or a combination comprising at least one of the foregoing organic polymers.

12. The method of claim 1, wherein the organic polymer composition comprises polyetherimides.

13. The method of claim 1, wherein the textured film has a birefringence retardation of less than or equal to about 100 nanometers.

14. The method of claim 1, further comprising annealing the organic polymer composition to a temperature above the highest glass transition temperature of the organic polymer composition.

15. The method of claim 4, further comprising melt filtering the organic polymer composition.

16. The method of claim 1, wherein the textured film has a ratio of texturing of the ratio of texturing is 0.75 to 3.0.

17. The method of claim 16, wherein the ratio of texturing of the textured film is 1 to 2.0.

18. The method of claim 3, wherein the textured metal surface has a surface average roughness of about 3 to about 7 micrometers.

19. The method of claim 18, wherein the textured metal surface has a surface average roughness of about 4 to about 7 micrometers.

20. The method of claim 1, wherein a surface average roughness on one surface of the textured film is within about 25% of the surface average roughness on an opposing surface of the textured film.

21. The method of claim 1, further comprising annealing the textured film to produce a film having a polish/polish surface.

22. The method of claim 1, wherein the textured film has a ratio of texturing of about 0.5 to about 3.

23. The method of claim 1, wherein the textured film has a thickness of about 5 to about 50 micrometers.

24. The method of claim 1, wherein the deforming produces a textured film having a rubber side replication efficiency of greater than or equal to 100%.

25. A method comprising:
    extruding an organic polymer composition to calendaring rolls comprising a first roll that comprises a rubber surface and a second roll that comprises a textured metal surface, wherein the organic polymer composition enters a gap between the first roll and the second roll at below a glass transition temperature of an organic polymer in the organic polymer composition; and
    thermoforming the organic polymer composition, the thermoforming being conducted by an application of a shear force, an elongational force, a compressive force, or a combination comprising at least one of the foregoing forces; the forces being applied to the organic polymer composition as it is disposed between the calendaring rolls; the thermoforming producing a textured film having a rubber side replication efficiency of greater than or equal to 100%; the textured film having a thickness of about 5 to about 50 micrometers.

26. The method of claim 25, further comprising winding the textured film on a storage roll without adhering adjacent layers of the textured film together.

27. The method of claim 25, wherein the textured film has a ratio of texturing of about 0.5 to about 3.

28. The method of claim 25, wherein the textured film has a thickness of about 5 to about 37.5 micrometers.

29. The method of claim 25, wherein the textured film is optically clear.

* * * * *